Feb. 12, 1924.

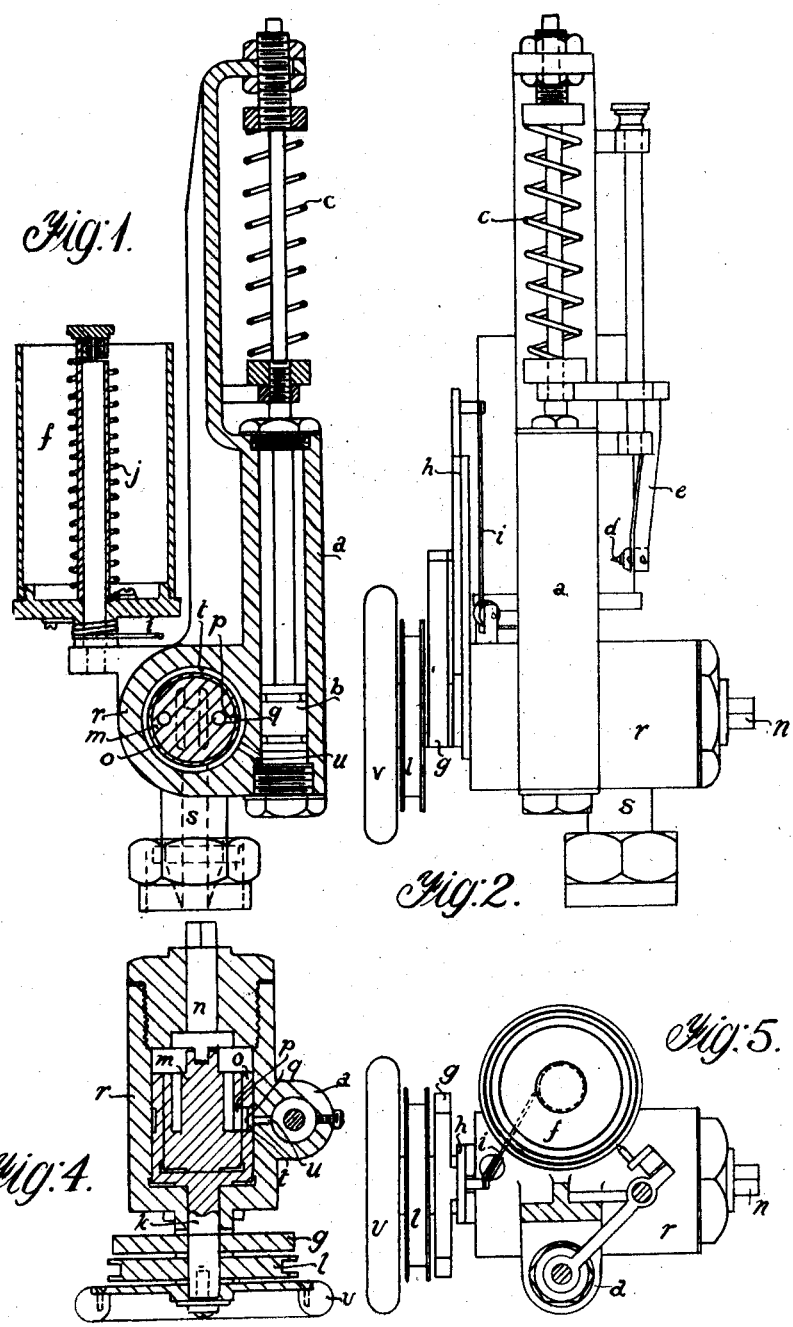

C. H. GALE 1,483,171

INDICATOR FOR RECIPROCATING ENGINES

Filed Dec. 1, 1922   3 Sheets-Sheet 2

INVENTOR.
Charles Henry Gale
by Arthur (signature)
Attorney.

Feb. 12, 1924. 1,483,171
C. H. GALE
INDICATOR FOR RECIPROCATING ENGINES
Filed Dec. 1, 1922 3 Sheets-Sheet 3
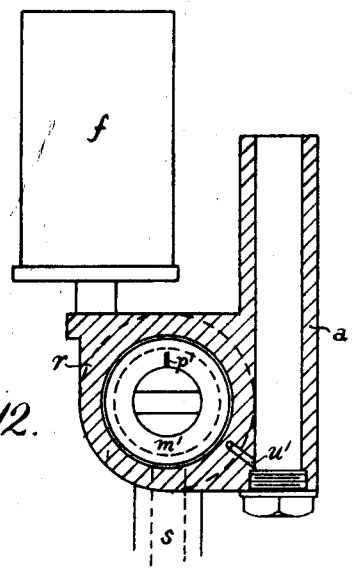
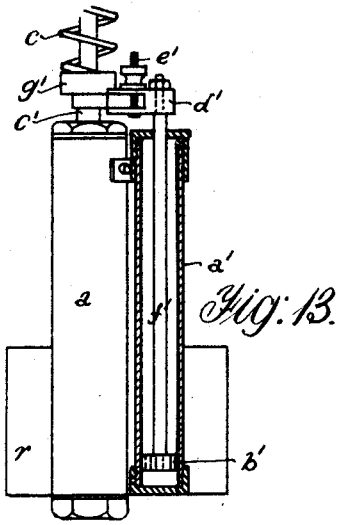
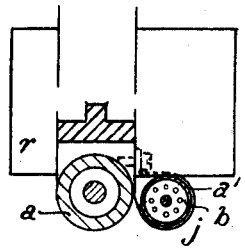
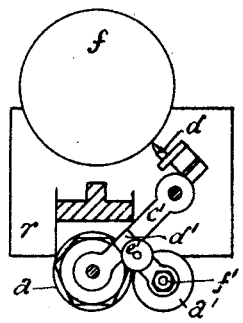
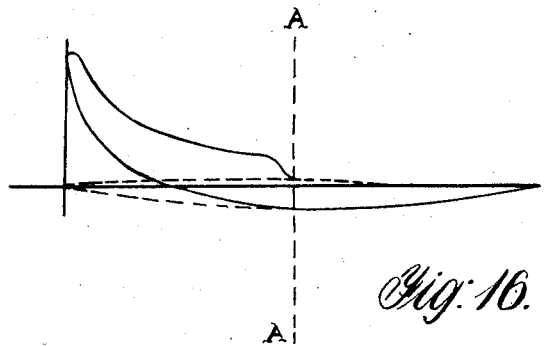
INVENTOR.
Charles Henry Gale.
by Arthur Stephens
Attorney.

Patented Feb. 12, 1924.

1,483,171

UNITED STATES PATENT OFFICE.

CHARLES HENRY GALE, OF ST. JOHNS, BISHOPSTOKE, ENGLAND.

INDICATOR FOR RECIPROCATING ENGINES.

Application filed December 1, 1922. Serial No. 604,436.

*To all whom it may concern:*

Be it known that I, CHARLES HENRY GALE, a subject of the King of Great Britain and Ireland, residing at St. Johns, Bishopstoke, in the county of Hants, England, have invented new and useful Improved Indicators for Reciprocating Engines, on which application has been made for Letters Patent in Great Britain No. 33,315 filed the 12th December 1921, of which the following is a specification.

This invention relates to a fluid pressure engine indicator in which the pressure indicating device is adapted to be connected momentarily in each successive cycle of the engine with the engine cylinder or the like at any predetermined point in said cycle and in which the recording surface of the indicator is adapted to be adjusted relatively to the pressure recording pencil or the like to correspond with any predetermined point in said cycle.

Briefly stated the present invention comprises a pressure indicating device adapted to be put into communication with the engine cylinder or the like by means of a valve comprising two co-axial sleeves adapted to be rotated relatively and in close contact with one another, the one in harmony with the engine and the other adjustably, each of said sleeves being formed with a port in such a position as to be enabled to register with the port in the other sleeve at a point in the cycle of the engine determined by the position of the adjustable sleeve. The recording drum or the like is adapted to be adjusted by means of a cam of such configuration as to be adapted to impart a movement representing the stroke of the engine piston.

The pressure indicating device is provided with a dash-pot or like dead beat device for the purpose of counteracting vibrations which may be transmitted thereto.

The invention will be described with reference to the drawings accompanying this specification.

Figure 1 is a sectional elevation of the indicator,

Figure 2 is an end elevation corresponding with Figure 1.

Figure 4 is a section on the line 4—4 of Figure 2,

Figure 5 is a plan of the indicator.

Figure 12 is a sectional elevation on line 14—14 of Figure 13 showing the recording drum in position.

Figure 13 is an elevation partly in section of the indicator cylinder and the dash-pot mechanism.

Figure 14 is a section on the line 16—16 of Figure 13.

Figure 15 is a plan corresponding with Figure 13.

Figure 16 shows a modified form of indicator diagram.

Figure 3:
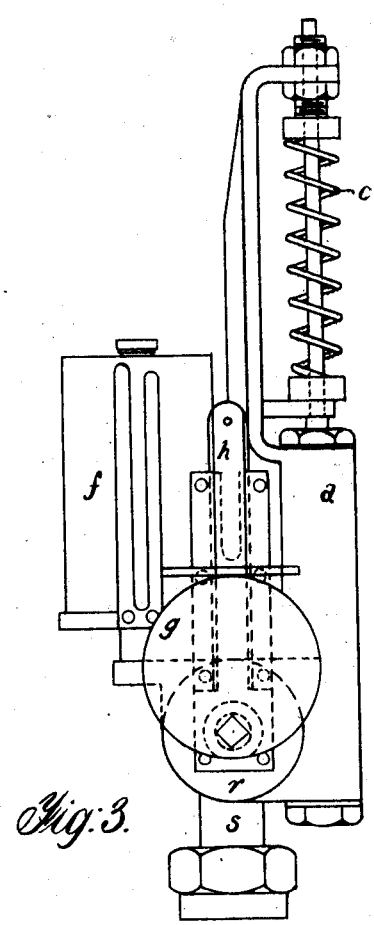
Figure 3 is a side elevation corresponding with Figure 1.

As shown in Figure 1 the indicator comprises a cylinder $a$ having a piston $b$ and compression spring $c$ and a recording drum $f$ adapted to be oscillated by means of the conjoint action of a cord $i$ and torsion spring $j$. The piston $b$ is connected with a pencil $d$ by means of an arm $e$, said pencil $d$ being adapted to be moved into or out of contact with the indicator card which is mounted on the drum $f$ in the usual manner. The cylinder $a$ is connected with the cylinder or its equivalent, of an engine (not shown) by means of a tube $s$ and a union, a controlling valve constructed as hereinafter set forth being interposed between the engine cylinder and the indicator cylinder $a$.

One form of the controlling valve referred to above is shown in Figure 4 and is contained in a body $r$ which may be formed integrally with the cylinder $a$ and other stationary parts of the indicator.

The body $r$ is bored out to form a cylinder one end of which is open and threaded internally for the reception of an axially apertured plug, and the other end of which is closed with the exception of an axial aperture. Extending through the last mentioned axial aperture is a spindle $k$ having an extension in the form of a sleeve $o$, the peripheral surface of which fits rotatably in the valve cylinder $r$ and the inner portion of which accommodates rotatably a cylindrical plug $m$, the outer end of which is slotted diametrically for engagement with a tongue projecting from the inner end of a spindle $n$ which extends rotatably through the axial aperture in the screwed plug.

The outer surface of the sleeve $o$ has a peripheral groove $t$ intermediately of its ends and a radial slot or port $q$ pierces the bottom of said groove $t$ at one point therearound. An aperture $u$ in the body $r$ in constant communication with said groove $t$ connects the port $q$ with the cylinder $a$ and a port $p$ in the plug $m$, adapted to register once per revolution with said port $q$, is connected by means of a longitudinal passage in said plug $m$ with the interior of the body $r$ which is in turn connected with the engine cylinder through the pipe $s$. The sleeve $o$ is adapted to be rotated adjustably by means of a hand-wheel $r$ mounted on the outer end of the spindle $k$ or continuously at any desired speed by means of a belt passing over a pulley $l$ which is also mounted on the spindle $k$.

The spindle $k$ also carries a cam or crank $g$ of suitable configuration which, on rotation of the spindle $k$ reciprocates a sliding member $h$ mounted in guideways and connected by means of the cord $i$ with the recording drum $f$.

The outer end of the spindle $n$ is connected by means of chain and sprocket or equivalent positive gearing with the engine driving shaft in order that the valve plug $m$ my be rotated synchronously with the engine.

By suitably adjusting the handwheel $r$ the ports $p$ and $q$ may be constrained to register one with the other at any desired point in the engine cycle and consequently the pressure in the engine cylinder or its equivalent at that point in the cycle, is communicated at each cycle, to the cylinder $a$ and the piston $b$, and by it the pencil $d$, is raised against the force of the spring $e$ to a corresponding position relatively to the indicator card. At the same time, the cam $g$ having been suitably adjusted relatively to the spindle $k$, the recording drum is moved by the rotation of the handwheel $r$ to a position, relatively to the pencil $d$, corresponding with the predetermined point in the cycle of the engine and consequently the pencil $d$ is in a position to record a point on the indicator card corresponding with the pressure in the engine cylinder when the piston is at a particular predetermined point in the engine cycle.

In a similar manner a series of points may be obtained on the indicator card corresponding with other points in the cycle and consequently the curve formed either by a succession of such points or by connecting such points gives an average indicator diagram for the engine over a number of cycles.

As will be seen the only reciprocating movements of the indicator mechanism are so slow irrespective of the speed of the engine if the sleeve $o$ be set manually as to eliminate entirely all inertia effects and consequently a true diagram is obtained.

Figures 13 to 15 illustrate a modification of the invention in which the movement of the piston $b$ is controlled by dash-pot mechanism and is intended for use where the indicator is subjected to vibration. As shown in these Figures a dash-pot cylinder $a'$ parallel with and secured to or formed integrally with the cylinder $a$ has a perforated piston $b'$ adapted to slide therein, said piston $b'$ being connected by means of a piston rod $f'$ and a cross-head $d'$ with the cross-head $c'$ of the piston $b$ so as to be movable therewith. The free end of the cross-head $d'$ is bifurcated for the purpose of embracing the cross-head $c'$, the engagement between said cross-heads $d'$ and $c'$ being maintained by means of a clamping screw $e'$. The cylinder $a'$ is filled with oil or other viscous fluid and consequently the speed of movement of the pistons $b$ and $b'$ depends on the rate of flow of the oil through the perforations in the piston $b'$.

The effect of the dash-pot is to restrain movement of the piston $b$ during the cycle of the engine between those points in the cycle at which the cylinder $a$ is in communication with the engine cylinder.

Figures 9 to 12 illustrate a modified form of connecting valve in which the movable portions $m'$ and $o'$ of the valve make plane face contact with one another and are held in contact by the force of a spring $v'$ disposed between the screwed-in end of the valve body $r$ and said portion $m'$.

The adjustable portion $o'$ of the valve fits rotatably in the body $r$ and has an annular recess $t'$ in that end remote from the portion $m'$, said recess $t'$ communicating on the one side with the cylinder $a$ through a passage $u'$ and on the other side by way of a port $q'$ with the engine cylinder through a port $p'$, in the portion $m'$, and the pipe $s$.

The operation of this modified valve in relation to the indicator as a whole is identical with that of the valve previously described.

When it is desired to take an indicator diagram from an engine working on a two-stroke cycle the rotary portion $m$ or $m'$ of the controlling valve is preferably connected with the engine shaft so as to be driven at the same speed as said shaft and the cam $g$ is of such configuration as to produce one complete oscillation of the recording drum $f$ for each revolution of the handwheel $r$ or adjustable valve $o$.

When however the engine operates on a four-stroke cycle the portion $m$ or $m'$ of the connecting valve should be driven at half the speed of the engine shaft and the recording drum $f$ should make two complete oscillations for one revolution of the handwheel $v$ or adjustable valve $o$.

One method of producing two oscillations of the drum $f$ per revolution of the handwheel $v$ is to substitute for the cam $g$ Figures 1 to 5 a double cam giving two throws per revolution.

Figure 8:
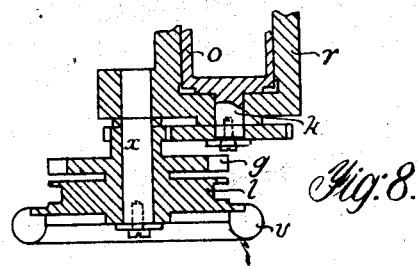
Figure 8 is a section on the line 9—9 of Figure 7.
Figure 9:
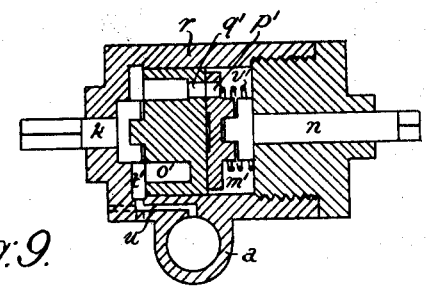
Figure 9 is an axial section of one form of connecting valve.
Figures 10, 11:
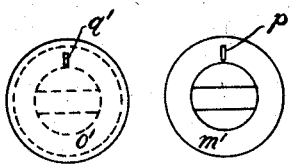
Figure 10 is a face view of the adjustable portion of the connection valve.
Figure 11 is a face view of the rotary portion of the valve shown in Figure 9.

A second method of obtaining the double oscillation is to mount the cam $g$ or its equivalent on a secondary shaft $x$ parallel with the axis of the spindle $k$ as shown in Figures 8 and 9 and to connect said spindle $k$ and shaft $x$ by means of two to one spur gearing such as $y$, $z$. The handwheel $v$ and pulley $7$ may be mounted on the shaft $x$ as shown in Figures 8 and 9 or may be mounted on the spindle $k$.

In the usual diagram for an internal combustion engine working on the four stroke cycle, shown on the left of line A—A in Figure 16, the area of the diagram representing the work done on the gases, i. e. the pumping effect, and which must be subtracted from the area representing work done by the expanding gases in order to obtain the net work done per stroke, is often so narrow and so confused by intersecting lines that accurate mensuration of that area is difficult. In order to overcome this difficulty it is proposed to transfer this portion of the diagram to another portion of the indicator card, as shown on the right of line A—A in Figure 16, by inverting that portion (shown in broken lines) of the diagram representing the exhaust and induction stroke so that, e. g., the line representing the exhaust stroke appears as an extension or continuation of that representing the expansion stroke. If the length of the diagram be bisected on the line A—A it will be seen that the difference between the areas of the two halves of the enclosed area, represents accurately the net work done per stroke.

Figure 6:
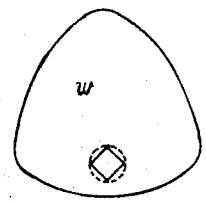
Figure 6 is a front elevation of a cam.
Figure 7:
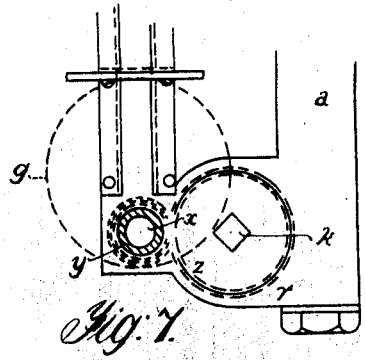
Figure 7 is a fragmentary elevation of a modification.

In order to obtain a diagram of the character mentioned the cam $g$ is replaced by a cam such as $w$ (Figure 6) which is of such configuration as to be adapted to impart to the recording drum a two part throw, each forward or backward movement of said drum representing an outward and an inward stroke of the engine piston; that is to say, one revolution of the cam $w$ represents two revolutions of the engine shaft.

In this case, of course, the cam $w$ is rotated at the same speed as the adjustable valve $o$ and the rotary valve $p$ is rotated at half the speed of the engine shaft.

It is desirable that the cam $g$ or its equivalent be so designed as to compensate for the obliquity of the engine connecting rod and for any want of alignment of the engine piston and crank-shaft.

What I claim is:

1. A fluid pressure engine indicator comprising a bracket, a pressure recorder mounted on said bracket, a valve chamber mounted on said bracket, two co-axial ported sleeves relatively rotatable and in close contact forming a valve mounted on said chamber, means for rotating one sleeve in harmony with the engine, means for adjustably rotating the second sleeve independently of the engine to enable the ports in said sleeves to register at any desired point in the engine cycle, means for connecting said valve with the pressure recorder and simultaneously the engine cylinder at a predetermined point in each cycle, a recording drum mounted on said bracket, a cam connected with said independently adjustable sleeve and adapted to impart to the said recording drum a movement representing the movement of the engine piston and a dashpot device connected with the pressure recorder.

2. A fluid pressure indicator comprising a bracket, a pressure cylinder mounted in said bracket, a piston working in said cylinder, a piston rod carried by said piston, an extended bracket attached to said cylinder, an exterior spring attached to said extended bracket, said spring pressing in said piston rod, a guide rod mounted on said extended bracket, an arm attached to said piston rod and working on said guide rod, a recording pencil at end of said arm, a valve chamber mounted on said bracket, communicating at one end with said cylinder and at the other with the engine cylinder, two co-axial ported sleeves forming a valve mounted on separate shafts in said valve chamber, means for rotating one sleeve in harmony with the engine, a handwheel and cam mounted on the shaft of the second sleeve, guides mounted on said bracket, a reciprocating member working in said guides, said cam adapted to impart motion to said reciprocating member corresponding to the motion of the engine piston, a spindle mounted on said bracket, a recording drum rotatably mounted on said spindle, a spring co-axially mounted in said spindle to control said drum, means for attaching a record sheet to said drum, pulleys attached to said bracket, a cord attached to said reciprocating member and to said drum passing over said pulleys and adapted to rotate the said drum, an oil cylinder on said bracket, parallel to said pressure cylinder, an oil piston having holes therethrough working in said oil cylinder, a piston rod attached to said oil piston, and a crosshead rigidly uniting the upper ends of the said piston rods.

3. A fluid pressure indicator comprising a bracket, a pressure cylinder mounted on said bracket, a piston working in said cylinder, a piston rod carried by said piston, an extended bracket attached to said cylinder, an exterior spring attached to said extended bracket, said spring pressing in said piston rod, a guide rod mounted on said extended bracket, an arm attached to said piston rod, and working on said guide rod, a recording pencil at end of said arm, a valve chamber mounted on said bracket, communicating at one end with said cylinder and at the other with the engine cylinder, two co-axial ported sleeves forming a valve mounted on separate shafts in said valve chamber, means for rotating one sleeve in harmony with the engine, a handwheel and cam mounted on the shaft of the second sleeve, guides mounted on said bracket, a reciprocating member working in said guides, said cam having a two part throw of such configuration as to be adapted to impart to said reciprocating member during any one forward or backward movement thereof motion corresponding to an outward and inward stroke of the piston, a spindle mounted on said bracket, a recording drum rotatably mounted on said spindle, a spring co-axially mounted on said spindle to control said drum, means for attaching a record sheet to said drum, pulleys attached to said bracket, a cord attached to said reciprocating member and to said drum, passing over said pulleys and adapted to rotate the said drum, an oil cylinder on said bracket, parallel to said pressure cylinder, an oil piston having holes therethrough working in said oil cylinder, a piston rod attached to said oil piston, and a crosshead rigidly uniting the upper ends of the said piston rods.

4. A fluid pressure indicator comprising a bracket, a pressure cylinder mounted on said bracket, a piston working in said cylinder, a piston rod carried by said piston, an extended bracket attached to said cylinder, an exterior spring attached to said extended bracket, said spring pressing in said piston rod, a guide rod mounted on said extended bracket, an arm attached to said piston rod, and working on said guide rod, a recording pencil at end of said arm, a valve chamber on said bracket communicating at one end with said cylinder and at the other with the engine cylinder, two co-axial ported sleeves forming a valve mounted on separate shafts in said valve chamber, means for rotating one sleeve in harmony with the engine, a gear wheel on the shaft of the second sleeve, a boss on said valve chamber, a shaft mounted on said boss, a handwheel second gear wheel and cam mounted on said shaft, said second gear wheel being in gear with said gear wheel on said second sleeve shaft, said gear wheels being designed so that two revolutions of said handwheel causes one revolution of said second sleeve, guides mounted on said bracket, a reciprocating member working in said guides, said cam adapted to impart motion to said reciprocating member corresponding to the motion of the engine piston, a spindle mounted on said bracket, a recording drum rotatably mounted on said spindle, a spring co-axially mounted in said spindle to control said drum, means for attaching a record sheet to said drum, pulleys attached to said bracket, a cord attached to said reciprocating member and to said drum, passing over said pulleys and adapted to rotate the said drum, an oil cylinder on said bracket, parallel to said pressure cylinder, an oil piston having holes therethrough working in said oil cylinder, a piston rod attached to said oil piston and a crosshead rigidly uniting the upper ends of the said piston rods.

In testimony whereof I have signed my name to this specification.

CHARLES HENRY GALE.